(12) United States Patent
Porte et al.

(10) Patent No.: US 8,602,346 B2
(45) Date of Patent: Dec. 10, 2013

(54) ACOUSTIC TREATMENT PANEL WITH INTEGRAL CONNECTING REINFORCEMENT

(75) Inventors: Alain Porte, Colomiers (FR); Jacques Lalane, Saint Orens de Gameville (FR)

(73) Assignee: Airbus Operations SAS, Toulouse (FR)

( * ) Notice: Subject to any disclaimer, the term of this patent is extended or adjusted under 35 U.S.C. 154(b) by 367 days.

(21) Appl. No.: 12/937,445

(22) PCT Filed: Apr. 7, 2009

(86) PCT No.: PCT/FR2009/050597
§ 371 (c)(1),
(2), (4) Date: Jan. 14, 2011

(87) PCT Pub. No.: WO2009/136062
PCT Pub. Date: Nov. 12, 2009

(65) Prior Publication Data
US 2011/0114787 A1 May 19, 2011

(30) Foreign Application Priority Data

Apr. 10, 2008 (FR) ...................................... 08 52410

(51) Int. Cl.
*B64C 1/40* (2006.01)
(52) U.S. Cl.
USPC ........................ 244/1 N; 244/53 B; 244/53 R

(58) Field of Classification Search
USPC ........... 244/1 N, 53 B, 53 R, 119, 121, 123.5, 244/129.1; 181/210, 214, 290, 292
See application file for complete search history.

(56) References Cited

U.S. PATENT DOCUMENTS 4,441,578 A * 4/1984 Rose .............................. 181/222
2002/0179773 A1 12/2002 Breer et al.

FOREIGN PATENT DOCUMENTS

FR 2887519 A1 12/2006

OTHER PUBLICATIONS

International Search Report, dated Nov. 3, 2009, from corresponding PCT application.

* cited by examiner

*Primary Examiner* — Timothy D Collins
*Assistant Examiner* — Nicholas McFall
(74) *Attorney, Agent, or Firm* — Young & Thompson

(57) ABSTRACT

An acoustic treatment panel includes, from the inside to the outside, a reflective layer (50), at least one alveolar structure (52), and at least one acoustically resistive structure (54) that forms an aerodynamic surface, whereby the panel is connected at one edge to at least one second panel (46), characterized in that it includes, at the edge overlapping with the at least one second panel, a reinforcement (60) that is inserted between the reflective layer (50) and the acoustically resistive structure (54) forming the aerodynamic surface, whereby the reinforcement (60) ensures the uptake of forces between the layer (50) and the structure (54).

14 Claims, 2 Drawing Sheets

US 8,602,346 B2

ACOUSTIC TREATMENT PANEL WITH INTEGRAL CONNECTING REINFORCEMENT

BACKGROUND OF THE INVENTION

1. Field of the Invention

This invention relates to an acoustic treatment panel that integrates a reinforcement for ensuring a connection with at least one other panel, aimed at reducing the untreated surface on the acoustic plane of an air intake of a nacelle.

2. Description of the Related Art

Figure 1:
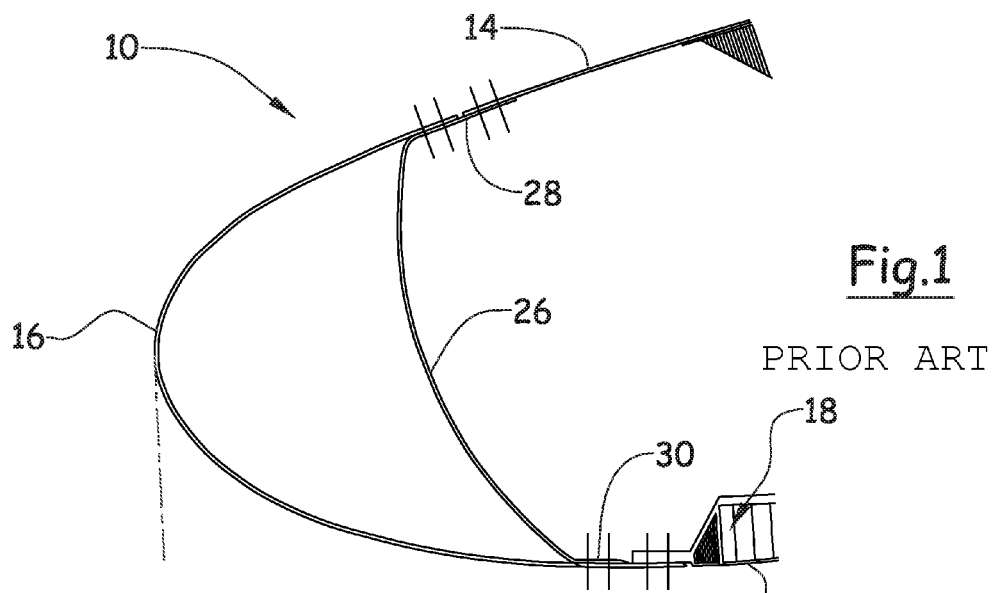

According to an embodiment illustrated in FIG. 1, a nacelle 10 comprises at least one pipe 12, a peripheral wall 14, and, at the front, an air intake that is delimited by a lip 16 that connects the pipe 12 and the peripheral wall 14.

In a known manner, the pipe 12 comprises a coating or panel 18 for acoustic treatment comprising, from the inside to the outside, a reflective layer 20, at least one alveolar structure 22, and at least one acoustically resistive structure 24 that forms the aerodynamic surface of the pipe 12. Advantageously, the lip 16 can also comprise a coating for acoustic treatment.

To reinforce the structure of the nacelle, a front frame 26 connects the pipe 12 and the peripheral wall 14, whereby the lip 16 is made integral with said front frame 26.

According to one embodiment, to ensure the connection between the panel that forms the lip 16 and the panel that forms the peripheral wall 14, the edges of said panels are flattened and then secured by any suitable means against a flange 28 of the front frame 26.

Figure 2:
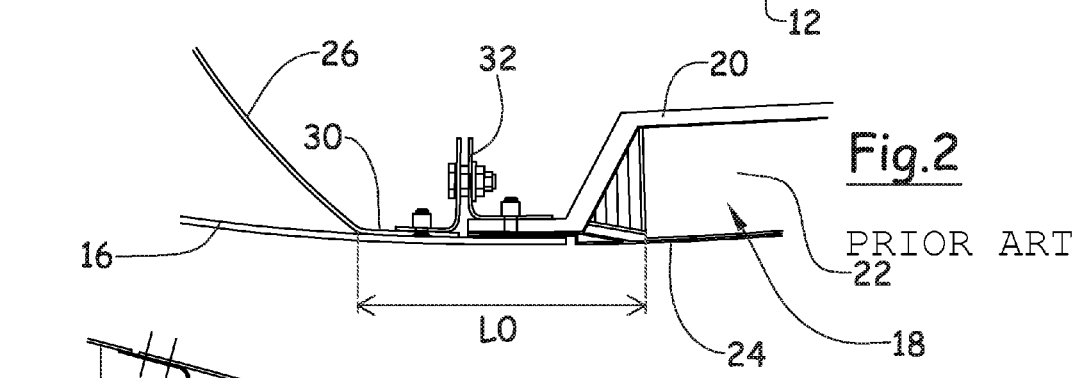

According to an embodiment that is illustrated in details in FIG. 2, at the junction zone of the pipe 12 and the lip 16, the front frame 26 comprises a flange 30 against which the wall forming the lip 16 is flattened. At this level, the reflective layer 20 and the acoustically resistive structure 24 have dimensions that are larger than those of the alveolar structure 22 so as to be convergent and then flattened against one another and secured against the inside surface of the lip that extends beyond the flange 30. In addition, a reinforcement 32 is provided to ensure the connection between, on the one hand, the two coupled layers 22 and 24, and, on the other hand, the front frame.

This configuration is not satisfactory for the following reasons:

Since the forces that pass through the reflective layer and through the acoustically resistive structure are not balanced, this creates a problem of unfolding at the junction zone with the lip and of delamination, whereby the different parts of the coating are made of composite materials for reasons of increasing weight.

According to another drawback, the terminal zone of the acoustic coating at which the reflective layer and the acoustically resistive structure are convergent is not treated on the acoustic plane. Consequently, this zone is combined with the superposition zones, on the one hand, of the lip and the front frame, and, on the other hand, of the lip and two coupled layers 22 and 24; this leads to a zone LO that is not treated on the important acoustic level.

SUMMARY OF THE INVENTION

Also, the purpose of this invention is to remedy the drawbacks of the prior art by proposing a panel for improved acoustic treatment that makes it possible to reduce the untreated zone on the acoustic plane and ensuring a better uptake of forces between the different layers of said panel at a junction zone with another panel.

For this purpose, the invention has as its object an acoustic treatment panel comprising, from the inside to the outside, a reflective layer, at least one alveolar structure, and at least one acoustically resistive structure that forms an aerodynamic surface, whereby said panel is connected at one edge to at least a second panel, characterized in that it comprises, at the edge that overlaps with said at least one second panel, a reinforcement that is inserted between the reflective layer and the acoustically resistive structure forming the aerodynamic surface, whereby said reinforcement ensures the uptake of forces between said layer and said structure.

BRIEF DESCRIPTION OF THE DRAWING FIGURES

Figure 3:
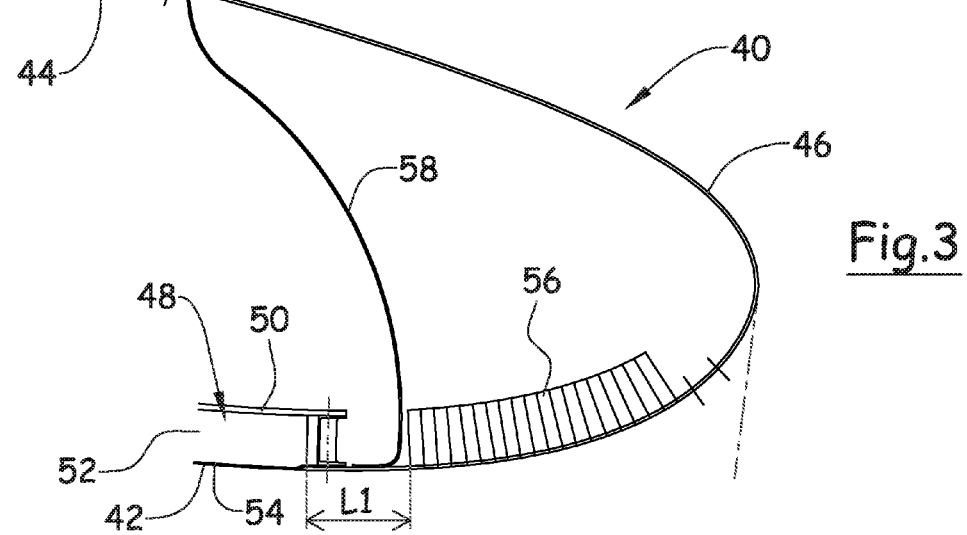
Figure 4:
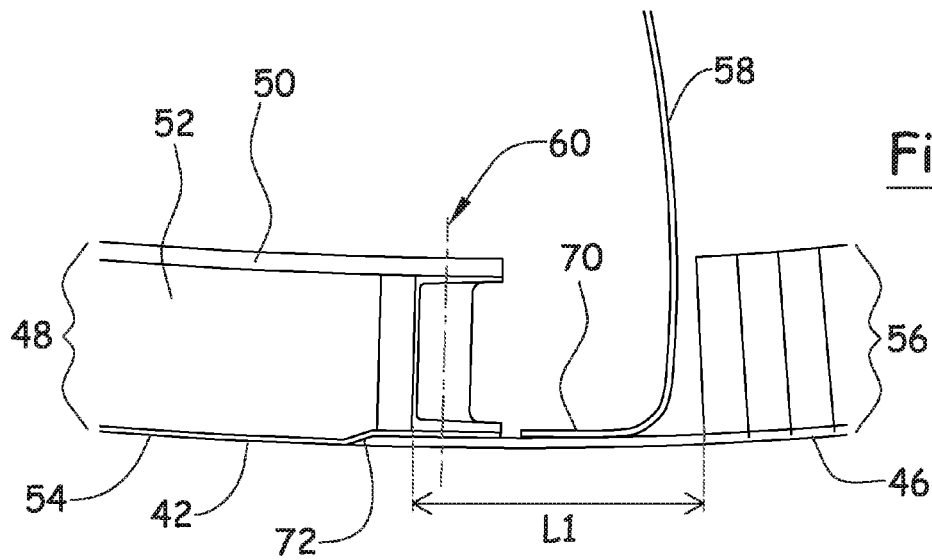
Figure 5:
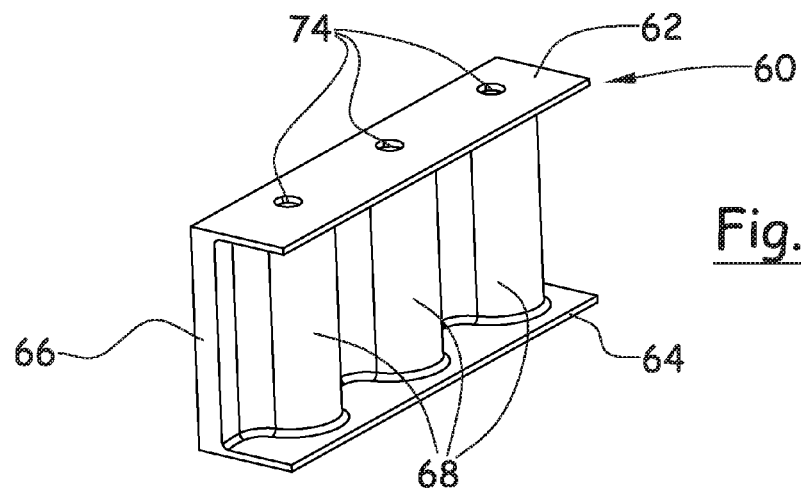
Figure 6:
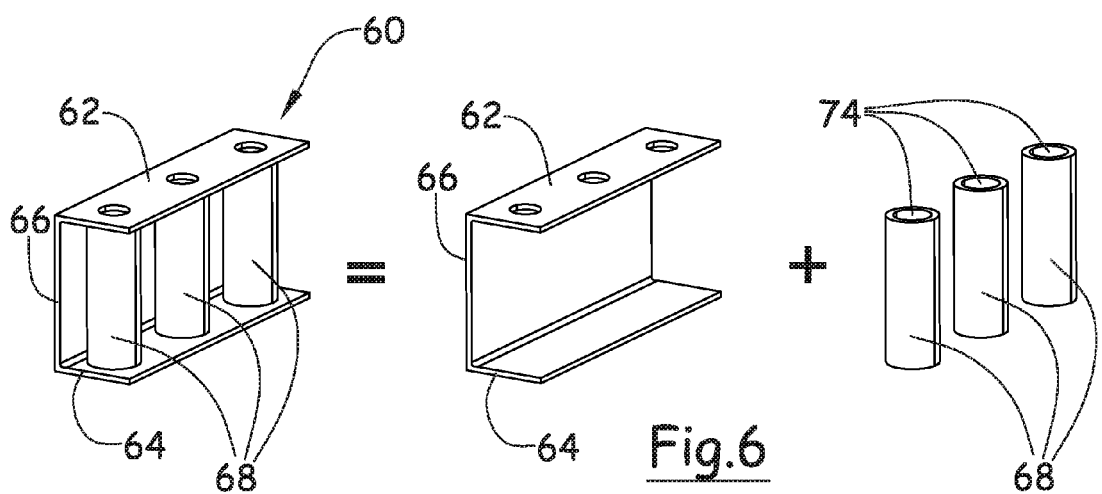

Other characteristics and advantages will emerge from the following description of the invention, a description that is provided only by way of example, relative to the accompanying drawings, in which:

FIG. 1 is a cutaway that illustrates the upper front portion of a nacelle according to the prior art, FIG. 2 is a cutaway that illustrates in details the junction zone between a lip, a front frame, and a pipe of the nacelle of FIG. 1, FIG. 3 is a cutaway that illustrates the upper front part of a nacelle according to the invention, FIG. 4 is a cutaway that illustrates in details the junction zone between a lip, a front frame, and a pipe of the nacelle of FIG. 3, FIG. 5 is a perspective view of an acoustic panel reinforcement according to the invention, and FIG. 6 is a view that illustrates an embodiment of a reinforcement device according to the invention.

DETAILED DESCRIPTION OF THE INVENTION

FIG. 3 shows the upper front part of a nacelle 40.

In a known manner, it comprises at least one pipe 42, a peripheral wall 44, and, at the front, an air intake that is delimited by a lip 46 that connects the pipe 42 and the peripheral wall 44.

The pipe 42 comprises a coating or panel 48 for acoustic treatment comprising, from the inside to the outside, a reflective layer 50, at least one alveolar structure 52, and at least one acoustically resistive structure 54 that forms the aerodynamic surface of the pipe 52.

Advantageously, the lip 46 also comprises a coating 56 for acoustic treatment.

To reinforce the structure of the nacelle, a front frame 58 connects the pipe 42, the peripheral wall 44, and the lip 46.

The connection between the panel that forms the lip 46, the panel that forms the peripheral wall 44, and the front frame 58 is not described in detail.

This invention relates more particularly to the junction zone between the front frame 58, the panel that forms the lip 46, and the panel that forms the pipe 42. At this zone, an edge of the panel 48 for acoustic treatment is made integral with at least one other panel, the one forming the lip and/or the one forming the front frame 58, whereby said at least one panel is flattened against at least one surface of said acoustic panel.

According to the invention, at the edge that overlaps with at least one other panel, the acoustic panel 48 comprises a reinforcement 60 that is inserted between the reflective layer 50 and the acoustically resistive structure 54 that forms the aerodynamic surface of the pipe 42 and that ensures the uptake of forces between the two layers 50 and 54.

This reinforcement 60 comes in the form of a section that comprises a first part 62 that offers a surface for contact with the inside surface of the reflective layer 50 and a second part 64 that offers a surface for contact with the inside surface of the acoustically resistive structure 54 and at least one wall 66 that ensures the connection and the uptake of forces between the parts 62 and 64. Advantageously, the wall 66 makes it possible to ensure the sealing of the zone between the reflective layer 50 and the acoustically resistive structure 54 at the end of the panel.

The contact surfaces of the parts 62 and 64 are essentially parallel and spaced at a distance that corresponds essentially to the deviation between the reflective layer 50 and the acoustically resistive structure 54 when said layers 50 and 54 are separated by the alveolar structure 52.

Advantageously, at least one crosspiece 68 is provided between the parts 62 and 64 to ensure the uptake of compression forces. According to the variants, said at least one crosspiece 68 is separate from the section, as illustrated in FIG. 6, or made of a single piece with the section as illustrated in FIG. 5.

According to the variants, the reinforcement 60 can have a closed cross-section—for example it can have a cross-section with a hollow or solid rectangular shape or a cross-section with a hollow or solid square shape—or an open cross-section—for example it can have a C-shaped cross-section.

Based on its shape, the reinforcement 60 can be metal, made of composite material or resin.

According to the invention, the dimensions of the alveolar structure(s) and optionally the separating acoustically resistive structure(s) are adjusted to make it possible to house the reinforcement 60 between the reflective layer 50 and the outside acoustically resistive structure 54.

As illustrated in FIG. 4, the pipe 42 comprises an acoustic treatment panel whose acoustically resistive structure 54 forms the aerodynamic surface of said pipe 42.

The panel that forms the lip 46 is made integral with a flange 70 of the front frame 58 and extends beyond said flange 70 to overlap the acoustic treatment panel 48 that forms the pipe 42. The panel that forms the lip 46 is secured against the outside surface of the acoustically resistive structure 54 that comprises a slight offset 72 for housing said panel that forms the lip 46 so that the outside surfaces of the lip 46 and the pipe 42 both extend on either side of this connecting zone.

The reinforcement 60 is arranged to the right of the zone for overlapping the lip and the acoustic panel, which makes it possible to reduce the untreated zone L1 on the acoustic plane relative to the prior art.

According to another embodiment, the reinforcement 60 can have a closed section and be arranged at the edge of the acoustic panel that covers the pipe 42 and at the edge of the acoustic panel that covers the lip 46, whereby the front frame 58 is made integral with said reinforcement.

This latter version makes it possible to optimize the treated surfaces on the acoustic plane.

According to another characteristic of the invention, the crosspieces 68 each comprise a bore 74 that empties at the surfaces for contact with the parts 62 and 64, making possible the passage of an attachment means such as a rod.

As appropriate, the reinforcement can comprise a row of crosspieces or two rows of crosspieces in particular when it has a closed section that is used to reinforce two acoustic panels placed end to end.

The invention claimed is:

1. An acoustic treatment panel comprising:
a reflective layer (50);
at least one alveolar structure (52);
at least one acoustically resistive structure (54) that forms an aerodynamic surface, the reflective layer (50), the at least one alveolar structure (52) and the at least one acoustically resistive structure (54) being arranged from an inside to an outside of the acoustic treatment panel; and
an edge of the panel which is connected to at least one second panel (46),
wherein at the edge overlapping with said at least one second panel, a reinforcement (60) that is inserted between the reflective layer (50) and the acoustically resistive structure (54) forming the aerodynamic surface, whereby said reinforcement (60) ensures the uptake of forces between said layer (50) and said structure (54), the reinforcement being a section that comprises a first part (62) that offers a surface for contact with an inside surface of the reflective layer (50) and a second part (64) that offers a surface for contact with an inside surface of the acoustically resistive structure (54), and at least one wall (66) that ensures connection and the uptake of forces between said parts (62, 64)
wherein the reinforcement (60) comprises at least one crosspiece (68) that is provided between the first and second parts (62, 64) for ensuring the uptake of compression forces.

2. The acoustic treatment panel according to claim 1, wherein the reinforcement is arranged to a right of a zone for overlapping a lip and the acoustic panel, whereby an untreated zone L1 is reduced.

3. The acoustic treatment panel according to claim 1, wherein the crosspieces (68) each comprise a bore (74) that empties at the contact surfaces of the parts (62, 64), making possible the passage of an attachment device.

4. The acoustic treatment panel according to claim 3, wherein the attachment device is a rod.

5. An aircraft nacelle that comprises
at least one pipe (42) that is coated with an acoustic panel (48) with, from an inside to an outside, a reflective layer (50), at least one alveolar structure (52), and at least one acoustically resistive structure (54) that forms an aerodynamic surface of said pipe (42); and
an air intake that is delimited by a panel that forms a lip (46) of which one part of the lip is secured against an outside surface of the acoustically resistive structure (54),
wherein the acoustic panel comprises, at an edge overlapping with the panel forming the lip (46), a reinforcement (60) inserted between the reflective layer (50) and the acoustically resistive structure (54) forming the aerodynamic surface, whereby said reinforcement ensures the uptake of forces between said layer (50) and said structure (54), the reinforcement being a section that comprises a first part (62) that offers a surface for contact with an inside surface of the reflective layer (50) and a second part (64) that offers a surface for contact with an inside surface of the acoustically resistive structure (54), and at least one wall (66) that ensures connection and the uptake of forces between said parts (62, 64)
wherein the reinforcement (60) comprises at least one crosspiece (68) that is provided between the first and second parts (62, 64) for ensuring the uptake of compression forces.

6. The aircraft nacelle according to claim 5, wherein the crosspieces (68) each comprise a bore (74) that empties at the contact surfaces of the parts (62, 64), making possible the passage of an attachment device.

7. The aircraft nacelle according to claim 6, wherein the attachment device is a rod.

8. The aircraft nacelle according to claim 5, wherein the acoustic treatment panel comprises a slight offset (72) for housing the panel that forms the lip (46).

9. The aircraft nacelle according to claim 5, wherein the reinforcement (60) has a closed section and is arranged at the edge of an acoustic panel that covers the pipe (42) and at the edge of an acoustic panel that covers the lip (46), whereby a front frame (58) is made integral with said reinforcement (60).

10. The aircraft nacelle according to claim 5, wherein the acoustic treatment panel comprises a slight offset (72) for housing the panel that forms the lip (46).

11. The aircraft nacelle according to claim 5, wherein the reinforcement (60) has a closed section and is arranged at an edge of an acoustic panel that covers the pipe (42) and at the an edge of an acoustic panel that covers the lip (46), whereby a front frame (58) is made integral with said reinforcement (60).

12. The aircraft nacelle according to claim 5, wherein the reinforcement is arranged to a right of a zone for overlapping the lip and the acoustic panel, whereby an untreated zone L1 is reduced.

13. An acoustic treatment panel comprising:
a reflective layer (50);
at least one alveolar structure (52);
at least one acoustically resistive structure (54) that forms an aerodynamic surface, the reflective layer (50), the at least one alveolar structure (52) and the at least one acoustically resistive structure (54) being arranged from an inside to an outside of the acoustic treatment panel; and
an edge of the panel connected to at least one second panel (46),
wherein at the edge overlapping with said at least one second panel, a reinforcement (60) is inserted between the reflective layer (50) and the acoustically resistive structure (54) forming the aerodynamic surface, the reinforcement (60) being arranged to a right of a zone for overlapping the lip and the acoustic panel, whereby said reinforcement (60) ensures the uptake of forces between said layer (50) and said structure (54) and an untreated zone L1 is reduced
wherein the reinforcement (60) is a section that comprises a first part (62) that offers a surface for contact with an inside surface of the reflective layer (50) and a second part (64) that offers a surface for contact with an inside surface of the acoustically resistive structure (54), and at least one wall (66) that ensures the connection and the uptake of forces between said parts (62, 64),
wherein the reinforcement (60) comprises at least one crosspiece (68) that is provided between the parts (62, 64) for ensuring the uptake of compression forces.

14. The acoustic treatment panel according to claim 13, wherein the crosspieces (68) each comprise a bore (74) that empties at the contact surfaces of the parts (62, 64), making possible the passage of an attachment device.

* * * * *

UNITED STATES PATENT AND TRADEMARK OFFICE
CERTIFICATE OF CORRECTION

PATENT NO. : 8,602,346 B2
APPLICATION NO. : 12/937445
DATED : December 10, 2013
INVENTOR(S) : Porte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this
Twenty-second Day of September, 2015

Michelle K. Lee
*Director of the United States Patent and Trademark Office*